(No Model.)
J. A. SHAW.
STEAM COOKER.
No. 325,980. Patented Sept. 8, 1885.
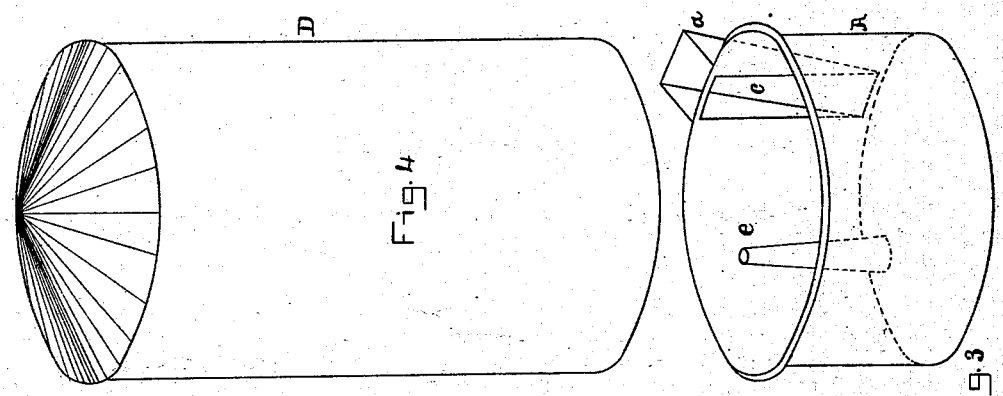
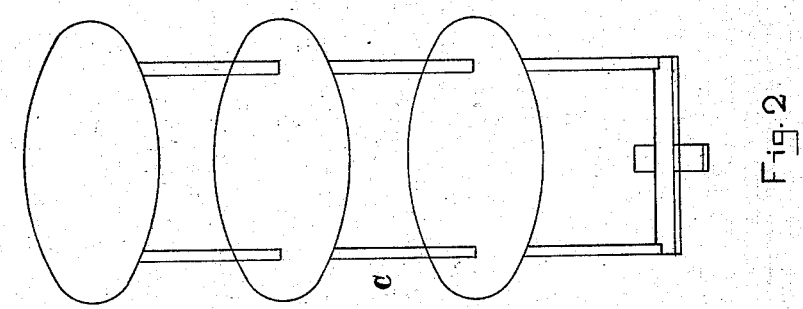
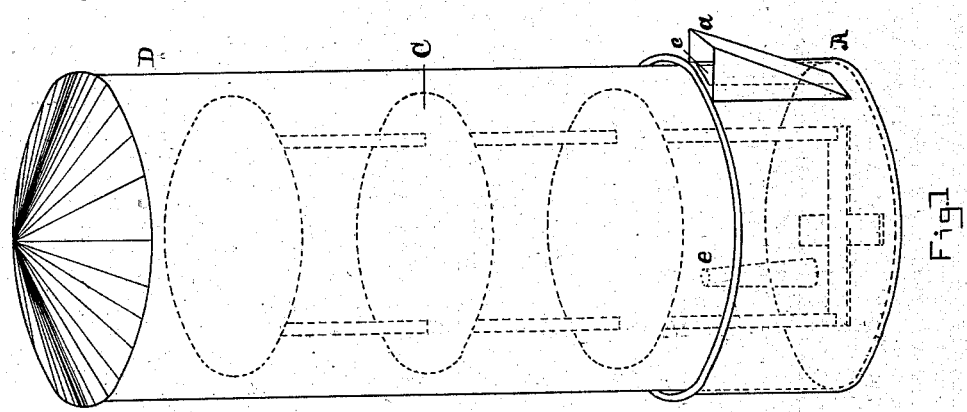
Witnesses:
J. R. Gray
Jacob Appell
Inventor:
John A. Shaw

United States Patent Office.

JOHN A. SHAW, OF AYER, MASSACHUSETTS.

STEAM-COOKER.

SPECIFICATION forming part of Letters Patent No. 325,980, dated September 8, 1885.

Application filed April 23, 1884. (No model.)

*To all whom it may concern:*

Be it known that I, JOHN A. SHAW, a citizen of the United States, residing at Ayer, in the county of Middlesex and State of Massachusetts, have invented a new and useful Improvement in Steam-Cookers; and I do hereby declare the following to be a full, clear, and exact description thereof, reference being had to the accompanying drawings, which constitute a part of this specification.

My invention has for its object to provide a construction which shall prevent the escape of steam and odor from the cooker when in use, and also to render it possible to remove any part of the contents placed therein without disturbing the remainder of such contents. To accomplish these results I provide a shallow cylindrical water-base having the usual escape-tube opening downward into the stove. Within this water-base I place an upright food rack or frame which supports any desired number of shelves arranged one above the other, and upon which are placed the different articles of food which it is desired to cook at the same time. I then provide a plain upright cylinder, closed at the top and open at the lower end, which is dropped down around the said rack and telescopes into the water-base, the lower edge of the cylinder resting on the bottom of the water-base below the level of the water, thus forming a perfect water-joint and effectually preventing the escape of steam or odor.

Referring to the accompanying drawings, Figure 1 is a perspective view of my improved cooker with all the parts in position, the food-rack and shelves C being shown by dotted lines. Fig. 2 is a view of the rack C; Fig. 3, a view of the water-base A; and Fig. 4 a view of the cylindrical jacket D which incloses the rack C.

A water-spout, $a$, is attached to the side of the water-base, and is connected with the interior of the same by a vertical slot, $c$, cut through the wall of the water-base and extending from top to bottom. This construction renders it easy to discover the depth of the water in the base and affords a convenient place to add more water when needed.

An escape-tube, $e$, is soldered to the bottom of the water-base at any convenient point and allows the surplus steam to pass downward into the stove during the operation of the cooker.

Having thus described my invention, what I claim is—

In a steam-cooking utensil, the combination of the upright food-rack C, the water-base A, surrounding the foot of the food-rack, and having the supply-spout $a$ and the escape-tube $e$, and the inverted inclosing-jacket D, inclosing the food-rack and telescoping within the body of the water-base to a point below the water-level and below the supply-spout to cut off the escape of steam, as set forth.

In testimony whereof I have affixed my signature hereto in the presence of two subscribing witnesses.

JOHN A. SHAW.

Witnesses:
J. R. GRAY,
JACOB APPELLS.